US006263284B1

United States Patent
Crider et al.

(10) Patent No.: US 6,263,284 B1
(45) Date of Patent: Jul. 17, 2001

(54) SELECTION OF SEISMIC MODES THROUGH AMPLITUDE CHARACTERISTICS

(75) Inventors: Richard L. Crider; Leon Thomsen; Gerard Beaudoin, all of Houston, TX (US)

(73) Assignee: BP Corporation North America Inc., Chicago, IL (US)

( * ) Notice: Subject to any disclaimer, the term of this patent is extended or adjusted under 35 U.S.C. 154(b) by 0 days.

(21) Appl. No.: 09/298,549

(22) Filed: Apr. 22, 1999

(51) Int. Cl.$^7$ .................................................. G01V 1/28
(52) U.S. Cl. ................................................ 702/14; 702/16
(58) Field of Search ............................................ 702/14, 16

(56) References Cited

U.S. PATENT DOCUMENTS

| | | | |
|---|---|---|---|
| 4,646,239 | 2/1987 | Bodine et al. | 364/421 |
| 4,677,597 | 6/1987 | Wright | 367/47 |
| 4,995,007 | 2/1991 | Corcoran et al. | 367/52 |
| 5,197,039 | 3/1993 | Corcoran et al. | 367/52 |
| 5,440,525 | 8/1995 | Dey-Sarkar et al. | 367/52 |
| 5,515,335 | 5/1996 | Swan | 367/47 |
| 5,551,881 * | 9/1996 | Henderson et al. | 434/299 |
| 5,661,697 | 8/1997 | Swan et al. | 364/421 |
| 5,838,564 * | 11/1998 | Bahorich et al. | 364/421 |
| 5,999,486 * | 12/1999 | DeVault | 367/36 |
| 6,049,759 * | 11/1998 | Etgen | 702/14 |

OTHER PUBLICATIONS

Castagna, John P. and Milo M. Backus (Editors). "Offset-Dependent Reflectivity—Theory and Practice of AVO Analysis." Society of Exploration Geophysicists, Tulsa, OK, 1993, pp. 3–36, 287–302.

Rutherford, Steven R. and Robert H. Williams. "Amplitude-versus-offset variations in gas sands." Geophysics, vol. 54, No. 6, Jun. 1989, pp. 680–688.

Tessmer, G. and A. Behle. "Common Reflection Point Data-Stacking Technique for Converted Waves." Geophysical Prospecting, vol. 36, 1988, pp. 671–688.

Yilmaz, Ozdogon. "Seismic Data Processing." Society of Exploration Geophysicists, 1987, pp. 9–89, 154–166, and 384–427.

Walden, A.T., "Making AVO Sections More Robust," Geophysical Prospecting 39, 915–942, 1991.

* cited by examiner

Primary Examiner—Christine Oda
Assistant Examiner—Victor J. Taylor
(74) Attorney, Agent, or Firm—James A. Gabala; T. Watt

(57) ABSTRACT

The instant invention is generally directed toward methods of using an AVO-type analysis on unstacked seismic data to identify subsurface exploration prospects. More particularly, a new method of identiflying and displaying converted mode seismic reflections is provided that has significant advantages over that in the prior art. Additionally, the instant invention can be used to attenuate or eliminate seismic reflections such as multiples that are not flattened by conventional velocity analysis. Further, a method is disclosed that provides for identification and display of only those seismic reflections deemed consistent with the usual or expected AVO behavior. Finally, another aspect of the instant invention involves the use of statistical goodness of fit measures, such as the Coefficient of Determination, to create a seismic display that is indicative of the degree to which each time slice in a gather conforms to a proposed AVO model.

24 Claims, 7 Drawing Sheets

SELECTION OF SEISMIC MODES THROUGH AMPLITUDE CHARACTERISTICS

TECHNICAL FIELD

This invention relates to the general subject of seismic exploration and, in particular, to methods for using offset dependent reflectivity in the exploration for hydrocarbons.

BACKGROUND OF THE INVENTION

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth, is reflected, and, upon its return, is recorded at a great many locations on the surface. Multiple source/recording combinations are then combined to create a near continuous profile of the subsurface that can extend for many miles. In a two-dimensional (2D) seismic survey, the recording locations are generally laid out along a single line, whereas in a three dimensional (3D) survey the recording locations are distributed across the surface in a grid pattern. In simplest terms, a 2D seismic line can be thought of as giving a cross sectional picture (vertical slice) of the earth layers as they exist directly beneath the recording locations. A 3D survey produces a data "cube" or volume that is, at least conceptually, a 3D picture of the subsurface that lies beneath the survey area. In reality, though, both 2D and 3D surveys interrogate some volume of earth lying beneath the area covered by the survey.

A seismic survey is composed of a very large number of individual seismic recordings or traces. In a typical 2D survey, there will usually be several tens of thousands of traces, whereas in a 3D survey the number of individual traces may run into the multiple millions of traces. Chapter 1, pages 9–89, of Seismic *Data Processing* by Ozdogan Yilmaz, Society of Exploration Geophysicists, 1987, contains general information relating to conventional 2D processing and that disclosure is incorporated herein by reference. General background information pertaining to 3D data acquisition and processing may be found in Chapter 6, pages 384–427, of Yilmaz, the disclosure of which is also incorporated herein by reference.

A modern seismic trace is a digital recording (analog recordings were used in the past) of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. Many variations of the conventional source-receiver arrangement are used in practice, e.g. VSP (vertical seismic profiles) surveys. Further, the surface location of every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data—and attributes extracted therefrom—on a map (i.e., "mapping").

The data in a 3D survey are amenable to viewing in a number of different ways. First, horizontal "constant time slices" may be taken extracted from a stacked or unstacked seismic volume by collecting all of the digital samples that occur at the same travel time. This operation results in a horizontal 2D plane of seismic data. By animating a series of 2D planes it is possible for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2D seismic line from within the 3D data volume.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

One particular branch of seismic attribute analysis that has been given increasing attention in recent years is amplitude-versus-offset ("AVO" hereinafter, or sometimes "AVA" amplitude-variation-with-angle-of-incidence) analysis, the broad goal of which is to make more easily visible to the explorationist offset-dependent reflectivity effects that may be found in some seismic data sets. The physical principle upon which AVO analyses are based is that the reflection and transmission coefficients at the top of an acoustic impedance boundary are dependent on the angle at which the seismic signal strikes that boundary. This property is true of all rock interfaces, but varies according to the particular properties of the rocks at the reflecting boundary. By way of example, gas-filled and water-filled sands have different reflection and transmission coefficients: these coefficients are also different for differing rock types, such as limestone (as compared with sandstone). Thus, by examining changes in seismic amplitude versus incidence angle (or its surrogate, shot-receiver offset) it is sometimes possible to make inferences about the subsurface lithology of a particular reflector that often could not otherwise be obtained without drilling.

These effects can sometimes be identified visually by arranging the moved-out seismic traces from a single gather (or from a composite "super" gather that includes more than one conventional gather) in order of the offset of each trace from the shot and then visually comparing the amplitudes on the near traces with the amplitudes on the far traces at the same time point. (See, for example, page 25 of "AVO Analysis: Tutorial & Review", by J. Castagna, appearing in *Offset-Dependent Reflectivity—Theory and Practice of AVO Analysis*, John Castagna and Milo Backus (editors), SEG Press, pp. 3–36, 1993, the disclosure of which is incorporated herein by reference). Alternatively, various AVO attributes may be calculated from the unstacked gather, each gather conventionally yielding one AVO attribute trace. By combining many of these attribute traces, entire sections or volumes may be formed that superficially resemble conventional seismic data, but which are, in reality, displays that can be used to quickly identify AVO-type effects.

The traditional AVO-type analysis involves fitting a parametric curve (i.e., a function characterized by one or more constant coefficients) to seismic amplitudes taken from a constant time "slice" of a moved-out CMP or other (e.g., common reflection point, "CRP", or common conversion point, "CPC") gather. However, the typical parametric representation is only appropriate for use with compressional or "P" type reflections. When other seismic propagation modes are present, the fitted curve may fail to adequately model the seismic data, which might potentially lead to spurious or masked hydrocarbon indicators.

By way of explanation, seismic energy propagates through the earth in one of two modes: compressional or "P" waves and shear or "S" waves, either of which might be generated by a wide variety of seismic sources. "Converted waves" are those waves that travel first as one type of wave and then the other, the conversion between wave-types happening at any seismic discontinuity. If the conversion happens once only, from an incident P-wave to a reflected S-wave, this mode will be referred to herein as a "C-wave". Additionally, multi-path (or multiple) reflections are a well known coherent noise source in seismic processing and exploration. A multiple reflection, as is well known to those skilled in the art, arises when seismic energy arrives at the surface after being reflected from more than one interface. For example, it is quite common in offshore settings to find that the original seismic signal "bounces" between the surface of the ocean and the ocean bottom a number of times during the seismic recording. This results in a repeating waveform that appears at regular time intervals throughout every recorded seismic trace (a "multiple"), the precise time separation being determined by the depth of the water, the velocity of sound in water at the recording location, and the shot-receiver offset. Additionally, it is also common to find interbed multiples in on-shore—and off-shore—surveys, these sorts of multiples arising when the seismic signal bounces up and down between two rock units. "Primary" reflections are P-mode waves that are reflected only once within the subsurface.

In conventional AVO analysis, these converted and multi-path reflections are regarded as coherent noise and suppressed—to the extent possible—during preparatory processing. However, this suppression is imperfect and invariably at least some energy from the unwanted modes is passed through, which energy has the potential to mask the true AVO effects and create false ones. Additionally, these modes—if not identified during pre-processing—can cause misinterpretations of the recorded seismic data and could ultimately lead to drilling a well based on an imperfect model of the subsurface.

Heretofore, as is well known in the seismic processing and seismic interpretation arts, there has been a need for a method of automatically identifying and extracting or suppressing particular seismic wave modes from the traces in a seismic survey. Additionally, this method should provide an improved method of conducting AVO analyses on seismic data. Accordingly, it should now be recognized, as was recognized by the present inventor, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

In accordance with the present invention, a method is disclosed herein for the automatic identification and extraction or suppression of primary reflections, converted-mode and multiple reflections in seismic data. In more particular, the instant invention operates on unstacked gathers to utilize the herertofore unrecognized statistical AVO signature of these sorts of waves as a means of identifiying, isolating, and/or eliminating or attenuating these sorts of reflections. Additionally, a novel method of performing AVO analyses with significant advantages over that in the prior art is also presented.

According to a first aspect of the instant invention, there is provided a method of attenuating non-primary reflection events (e.g., converted and multi-path arrivals) in an unstacked gather. In more particular, if seismic data are processed so that only the P-wave reflections are time-aligned in a moved-out CMP gather, and the aligned data are then fitted by an AVO polynomial, evaluation or "expansion" of that polynomial using the resultant estimated coefficients will tend to reproduce only the aligned reflectors. This approach will thus discriminate against and, in many cases effectively remove, coherent noise in the form of non-aligned modes (such as multiples) from the gather. Polynomial expansion will be discussed at some length below. The resulting unstacked traces are then usable by seismic processes such as prestack migration or stack.

According to a second aspect of the instant invention, there is provided a method of creating a seismic display that permits easy identification of those reflections within a seismic section or volume that may correspond to subsurface hydrocarbon accumulations. More particularly, it is well known that when one formation at a reflecting interface is a porous material (such as sandstone) containing oil or gas, the estimated values of certain of the AVO polynomial coefficients differ from those calculated from non-hydrocarbon containing units. Additionally, since the hydrocarbon signature may be more complex than just the particular value of one coefficient, but the signature might be recognized by combinations of the values of two or more coefficients. By recognizing those combinations that are—at least theoretically—correlated with hydrocarbons and only expanding the AVO polynomial for those cases, a display may be produced that contains only reflectors that may be candidates for exploration. This can be a tremendous boon to explorationists who must review large volumes of seismic data in the search for prospects, as only reflections indicated by the AVO analysis as being indicative of subsurface accumulations of oil or gas will appear within the section or the volume.

According to a third aspect of the instant invention, there is provided a novel means of identifying and eliminating from an unstacked gather reflectors corresponding to converted wave mode reflections. In more particular, by fitting an AVO-type polynomial to the seismic data at each time level and observing the relative magnitudes and signs of the coefficients so calculated, it is possible to differentiate flattened P-wave reflections from flattened C-wave reflections. Then, if polynomial expansion is applied only to those combinations of coefficients that do not match the converted-wave signature, a gather may be reconstructed in which these modes are attenuated or eliminated. Alternatively, if the calculated AVO polynomials are expanded only for those time points that match the required signature, a converted-wave-only section may be obtained.

According still another aspect of the instant invention, there is provided a method of polynomial expansion of AVO equations that is conditioned on the degree to which the calculated AVO polynomial fits the unstacked seismic data at each time point. In the preferred embodiment, the AVO polynomial is fit to the data and a statistical goodness of fit measure (such as the Coefficient of Determination, $r^2$) is also calculated, $^{2r}$ being one of a number of statistical quantities that measure the degree to which the seismic amplitude values are represented or "fit" by the AVO polynomial. Then, the AVO polynomials are expanded for those time levels that have an associated $r^2$ that is high, i.e., relatively "near" 1.0, thereby producing a gather with non-zero samples only where the data are well modeled by the AVO equation. This will produce a gather that contains seismic energy only at those times that are well predicted by the AVO model. Among the many circumstances that could give rise to a poor functional fit are departures of the seismic data from the AVO model, which might be caused by noise contamination from the generation of coherent energy such as multiples, head waves, or processing artifacts, or contamination by excessive random (incoherent) noise. Seismic data that have been made free of these effects are ideally suited for further processing, as at least some of the contaminated noise will have been attenuated or removed. Alternativley, the AVO polynomials may be expanded only for those time levels which correspond to a small (i.e., near 0.0) value of $r^2$, thereby making visually apparent those portions of the data that are not well fit by the chosen AVO model.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

DETAILED DESCRIPTION

Figure 1:
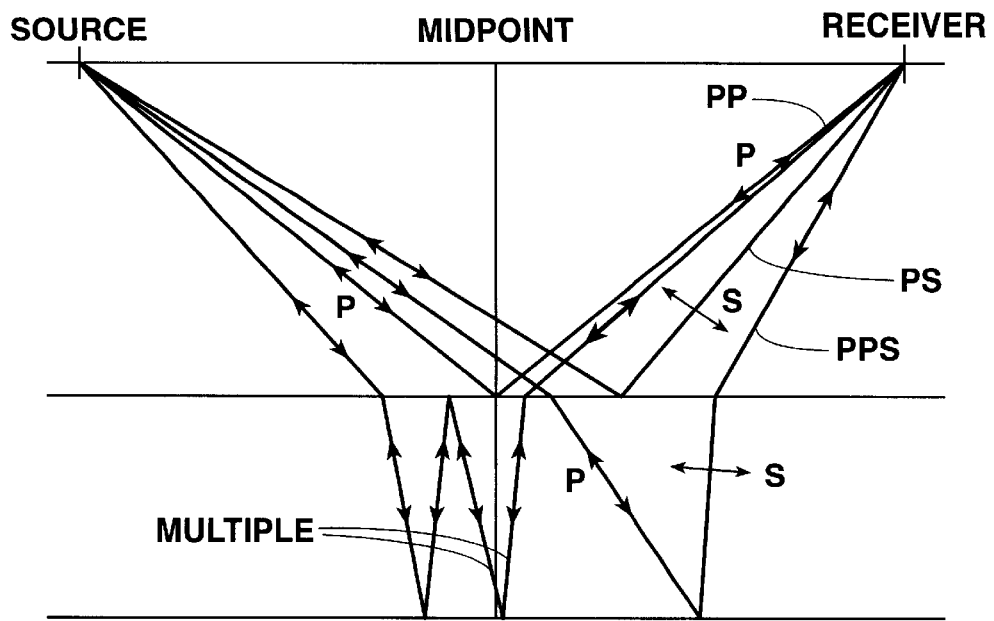
FIG. 1 contains a representation of the geometry associated with various multiple and converted mode reflections.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

Environment of the Invention

Figure 5:
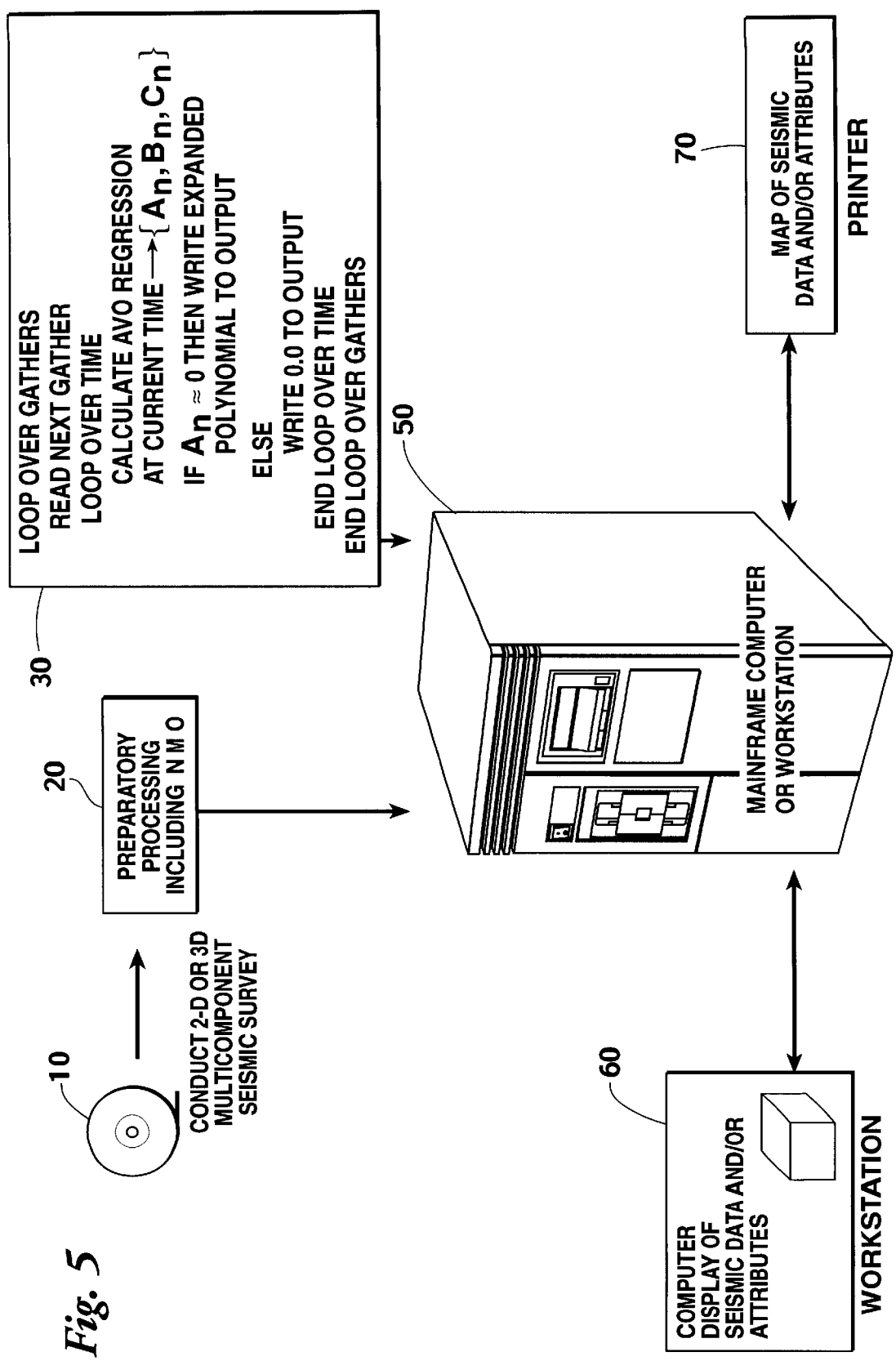
FIG. 5 illustrates generally the environment in which the invention disclosed herein would typically be used.

FIG. 5 illustrates the general environment in which the instant invention would typically be used. Seismic data 10 are collected in the field over a subsurface target of potential economic importance and are then sent to a processing center. There a variety of preparatory processes 20 are applied to the seismic traces to make them ready for use by the methods disclosed hereinafter. The processed traces would then be made available for use by the instant invention and might be stored, by way of example only, on hard disk, magnetic tape, magneto-optical disk, DVD disk, or other mass storage means.

The methods disclosed herein would best be implemented in the form of a computer program 30 that has been loaded onto a general purpose programmable computer 50 where it is accessible by a seismic interpreter or processor. A general purpose computer 50 includes, in addition to mainframes and workstations, computers that provide for parallel and massively parallel computations, wherein the computational load is distributed between two or more processors. As is also illustrated in FIG. 5, some sort of velocity model 40 is preferably specified by the user and provided as input to the processing computer program. The exact means by which such models are created, digitized, stored, and later read during program execution is unimportant to the instant invention and those skilled in the art will recognize that this might be done any number of ways.

A program 30 embodying the instant invention might be conveyed into the computer that is to execute it by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network. In a typical seismic processing environment, the methods of the instant invention would be made part of a larger package of software modules that is designed to perform many of the processing steps listed in FIG. 5. After processing by the instant methods, the resulting traces would then typically be sorted into gathers, stacked, and displayed either at a high resolution color computer monitor 60 or in hard-copy form as a printed seismic section or a map 70. The seismic interpreter would then use the displayed images to assist him or her in identifying subsurface features conducive to the generation, migration, or accumulation of hydrocarbons.

Preparatory Processing

Figure 4:
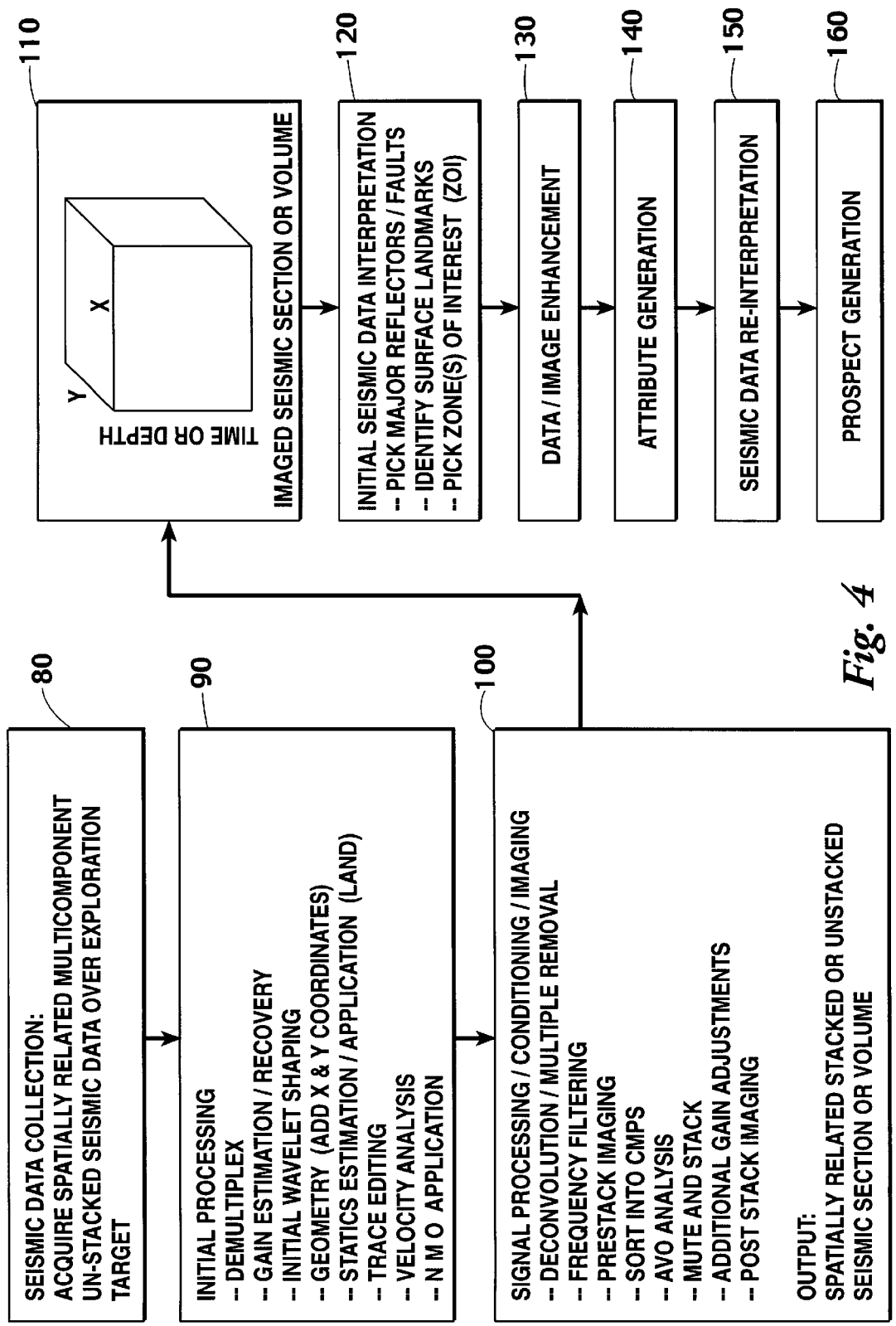
FIG. 4 is a schematic diagram that illustrates how the instant invention might be utilized within a conventional exploration seismic processing stream.

As a first step, and as is generally illustrated in FIG. 4, a 2D or 3D seismic survey is conducted over a particular volume of the earth's subsurface (step 80). The data that are collected in the field consist of unstacked (i.e., unsummed) seismic traces which contain digital information representative of the volume of the earth lying beneath the survey. Methods by which such data are obtained and processed into a form suitable for use by seismic processors and interpreters are well known to those skilled in the art. Additionally, those skilled in the art will recognize that the processing steps illustrated in FIG. 4 are only broadly representative of the sorts of steps that seismic data would normally go through before it is interpreted: the choice and order of the processing steps, and the particular algorithms involved, may vary markedly depending on the particular seismic processor, the signal source (dynamite, vibrator, etc.), the survey location (land, sea, etc.) of the data, and the company that processes the data.

The purpose of a seismic survey is to acquire a collection of spatially related seismic traces over a subsurface target of some potential economic importance. Data that are suitable for analysis by the methods disclosed herein might consist of, for purposes of illustration only, an unstacked 2-D seismic line, an unstacked 2-D seismic line extracted from a 3D seismic survey or, preferably, an unstacked 3D portion of a 3D seismic survey. The invention disclosed herein is most effective when applied to a group of unstacked seismic traces that have an underlying spatial relationship with respect to some subsurface geological feature. Again for purposes of illustration only, the discussion that follows will be couched in terms of traces contained within an unstacked 3-D survey, although any assembled group of spatially related unstacked seismic traces could conceivably be used.

After the seismic data are acquired, they are typically taken to a processing center where some initial or preparatory processing steps are applied to them. As is illustrated in FIG. 4, a common early step is the specification of the geometry of the survey (step 90). As part of this step, each seismic trace is associated with both the physical receiver (or array) on the surface of the earth that recorded that particular trace and the "shot" (or generated seismic signal) that was recorded. The positional information pertaining to both the shot surface position and receiver surface position are then made a permanent part of the seismic trace "header," a general purpose storage area that accompanies each seismic trace. This shot-receiver location information is later used to determine the position of the "stacked" seismic traces. It would normally be after the velocity analysis/NMO processing steps that one aspect of the instant invention would first be applied. An NMO correction adjusts the samples in each seismic trace according to their distance from that shot so that energy returning from the same reflectors are aligned at the same time on the seismic trace. This process is well known to those skilled in the art and will not be discussed further herein, although additional details are available in Yilmaz, cited previously, at pages 154–166, the disclosure of which is incorporated herein by reference.

After the initial pre-stack processing is completed, it is customary to condition the seismic signal on the unstacked seismic traces before creating stacked (or summed) data volumes (step 100). In FIG. 4, the "Signal Processing/Conditioning/Imaging" step suggests a typical processing sequence, although those skilled in the art will recognize that many alternative processes could be used in place of the ones listed in the figure. In any case, the ultimate goal from the standpoint of the explorationist is the production of a stacked seismic volume or, in the case of 2D data, a stacked seismic line for use in the exploration for hydrocarbons within the subsurface of the earth.

As is suggested in FIG. 4, any digital sample within a stacked seismic volume is uniquely identified by an (X, Y, TIME) triplet: the X and Y coordinates representing some position on the surface of the earth, and the time coordinate measuring a recorded arrival time within the seismic trace (step 110). For purposes of specificity, it will be assumed that the X direction corresponds to the "in-line" direction, and the Y measurement corresponds to the "cross-line" direction, as the terms "in-line" and "cross-line" are generally understood to mean in the art. Although time is the preferred and most common vertical axis unit, those skilled in the art understand that other units are certainly possible might include, for example, depth or frequency. Additionally, it is well known to those skilled in the art that it is possible to convert seismic traces from one axis unit (e.g., time) to another (e.g., depth) using standard mathematical conversion techniques. That being said, the discussion that follows will be framed largely in terms of "time" as a vertical axis measure, but that choice was made for purposes of specificity, rather than out of any intention to so limit the methods disclosed herein. Further, when "time" is described hereinafter as a vertical axis of a seismic trace, that term should be broadly construed to also include any other applicable vertical axis, including depth or frequency.

Another important use for seismic data is as a source for seismic attributes (step 140). As is well known to those skilled in the art, seismic attributes are values that are calculated from seismic data and that serve to highlight some specific property or feature of the data that might not otherwise be apparent. Although FIG. 4 seems to indicate that seismic attribute generation 140 takes place relatively late in the processing sequence, that is not always the case and attributes might potentially be calculated at almost any point in the sequence.

The explorationist may do an initial interpretation 120 of the resulting stacked volume, wherein he or she locates and identifies the principal reflectors and faults wherever they occur in the data set. Finally, as noted in FIG. 4, the explorationist will use the processed seismic data to locate subsurface structural or stratigraphic features conducive to the generation, accumulation, or migration of hydrocarbons (i.e., prospect generation 160). This effort may incorporate additional data from a variety of non-seismic sources including, for example, well logs, satellite surveys, gravity surveys, etc. Additionally, the explorationist may use the migrated data volume (either stacked or unstacked) as a source for the generation of seismic attributes 140 that may be displayed 60 and studied in their own right. Seismic attributes 140 can reveal subsurface details that are at odds with the initial seismic data interpretation 120, thus suggesting the need for a reinterpretation 150 of the seismic volume before moving to the prospect generation 160 stage.

Technical Background

The CMP method is well understood by those skilled in the art of seismic exploration and is a widely employed means of achieving high signal-to-noise ratios in seismic data. FIG. 1 broadly illustrates one key aspect of the CMP method—as well as some possible variants—for a typical seismic experiment. In general, each recorded trace will contain reflections of various modes from many reflecting horizons at many arrival times. A "gather" of traces from many such source-receiver combinations is formed through repetitions of this experiment and appropriate procedures to form accumulations of those traces that have a common source-receiver midpoint. In the case of 3D data, data all lying within the same "bin" (as that term is known and used in the art) constitute a gather. Through summation or stacking of these gathers or redundant seismic signals, reflection events which correspond to assumed ray paths are enhanced while other events are reduced. Before summation, the CMP gathers are processed using certain conventional procedures which include the normal moveout technique to compensate for the different ray paths, offset distances, and travel times.

Although it is conventional to assume that the recorded seismic traces contain only directly reflected P-wave events, in reality the situation is hardly ever that simple. Consider, for example, the ray paths depicted in FIG. 1, which illustrate a few of the many possibilities. There are direct (i.e., "PP") arrivals and multi-path ("multiple") arrivals. Additionally, it is possible to get various combinations of compressional and shear waves, including converted mode waves of the sort labeled "PS" and "PPS". Those skilled in the art will recognize that even more complex reflection patterns are possible.

Figure 2:
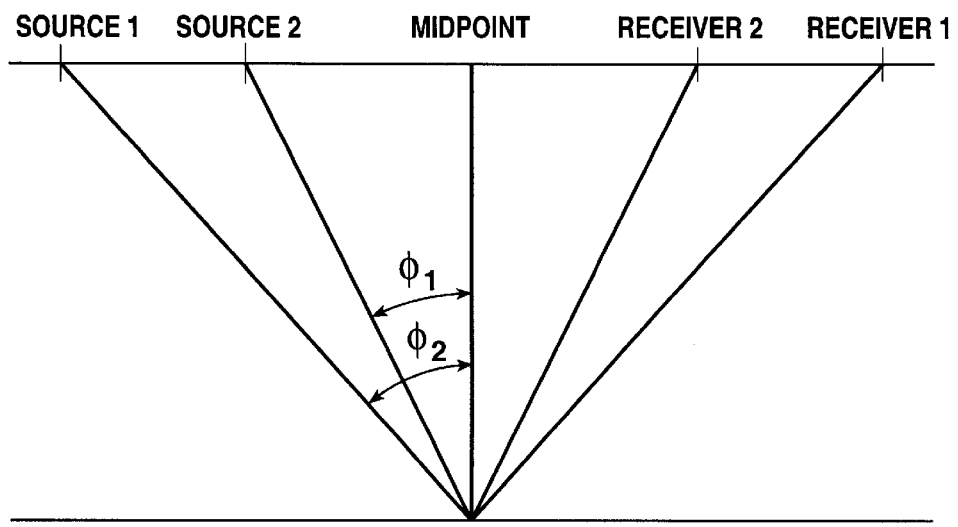
FIG. 2 illustrates the interrelationship between angle of incidence and source-receiver offset.

In seismic exploration, it is often desirable to display the gathers without summation (i.e., unstacked) in order to analyze the lateral variations in reflectivity. It is well known to those skilled in the art that the lateral variation in the amplitude of the primary P-wave reflection may be approximately described (c.f., Aki and Richards, 1980; Thomsen, 1994, and especially, Castagna, 1993 page 20–21) at every time by:

$$R_p(\phi) = A + B \sin^2(\phi) + C \sin^2(\phi) \tan^2(\phi) \quad (1)$$

where $\phi$ is the angle of incidence—with respect of the vertical, see FIG. 2—of a seismic wave on a rock interface, and A, B, and C are arbitrary constants, the values of which are typically estimated from the seismic data. In practice, $\phi$ might be estimated in any number of ways, but a preferred way is by ray-tracing through a geologic model of the subsurface.

Many alternative parametric formulations of the previous equation have also been suggested, including:

$$R_p(\phi) = A + B \sin^2(\phi) + C \sin^4(\phi) \quad (2)$$

$$R_p(\phi) = A \cos^2(\phi) + B \sin^2(\phi), \quad (3)$$

and, $$R_p(x) = A + B (x/x_m)^2 + C(x/x_m)^4 \quad (4)$$

where, "x" is the offset of a particular CMP trace and $x_m$ is the maximum offset in the gather.

The first two equations listed above are simple variations of equation (1) and are most useful when the range of values for $\phi$ is small. Equation (4) is most often applied when it is not desirable (or possible) to compute the incident angle. Obviously, other parametric forms (i.e., other than polynomials) might be used in place of the previous. However, the generic term "polynomial" will be used hereinafter to refer to a functional form characterized by constant coefficients which models reflectivity as a function of angle of incidence, trace offset or some other related measure.

Standard statistical curve fitting techniques, such as least squares regression, can be used to derive the parameters A, B, and C from the seismic data at each time point. That is, if the array X[n,m], m=1, M, n=1, N, represents a time-aligned CMP gather, where M is the number of traces and N the number of samples in each trace, then at each time point "n" it is conventional to solve the following matrix equation (which corresponds to equation (1) for the unknown constant coefficients A, B, and C):

$$\begin{bmatrix} X[n,1] \\ X[n,2] \\ \vdots \\ X[n,M] \end{bmatrix} \approx \begin{bmatrix} 1 & \sin^2(\phi_{n,1}) & \sin^2(\phi_{n,1})\tan^2(\phi_{n,1}) \\ 1 & \sin^2(\phi_{n,2}) & \sin^2(\phi_{n,2})\tan^2(\phi_{n,2}) \\ \vdots & \vdots & \vdots \\ 1 & \sin^2(\phi_{n,M}) & \sin^2(\phi_{n,M})\tan^2(\phi_{n,M}) \end{bmatrix} \begin{bmatrix} A_n \\ B_n \\ C_n \end{bmatrix} \quad (5)$$

where subscripts have been temporarily added to the constants A, B, and C (i.e., $A_n$, $B_n$, and $C_n$) to make clear their dependency on the time-level at which the regression is calculated; and where the symbol "≈" has been used to indicate approximate equality in the sense that the constants $A_n$, $B_n$, and $C_n$ are to be chosen so as to make the left and right sides of the equation as nearly equal as possible. Additionally, the angle-of-incidence parameter has been augmented with two subscripts, i.e., $\phi_{l,n}$, to reflect its dependency on the trace offset and the time level at which the parameter is calculated. Finally, note that rather than using the unknown earth reflectivity at each time point, $R_p(\phi)$, the seismic amplitude, X[m,n], is used instead. This substitution is commonly made by those skilled in the art and its propriety need not be discussed here (e.g., see Demirga, Coruh, and Costain, "Inversion of P-wave AVO," appearing in *Offset-Dependent Reflectivity—Theory and Practice of AVO Analysis*, John Castagna and Milo Backus (editors), SEG Press, pp. 287–302, 1993, the disclosure of which is incorporated herein by reference).

A numerical solution to the previous matrix equation might be obtained via normal least squares minimization, weighted least squares, or by minimization with respect to any other norm including, for example, robust norms such as the $L_1$ or least absolute deviation norm, the $L_p$ or least "p" power norm, or many other non-linear/hybrid norms such as those suggested in the statistical literature on robust estimators. See, for example, Peter J. Huber, *Robust Statistics*, Wiley, 1981. In terms of matrices, a standard least squares solution of the previous equation would take the form:

$$\hat{A} = (\phi^T \phi + \lambda I)^{-1} \phi^T X,$$

where $\hat{A}$ is a vector containing estimates of the parameters, A, B, and C; the vector X contains the seismic amplitudes taken from the seismic traces in the gather; $\phi$ is a matrix containing angle-dependent quantities, i.e., $$\Phi = \begin{bmatrix} 1 & \sin^2(\phi_{n,1}) & \sin^2(\phi_{n,1})\tan^2(\phi_{n,1}) \\ 1 & \sin^2(\phi_{n,2}) & \sin^2(\phi_{n,2})\tan^2(\phi_{n,2}) \\ \vdots & \vdots & \vdots \\ 1 & \sin^2(\phi_{n,M}) & \sin^2(\phi_{n,M})\tan^2(\phi_{n,M}) \end{bmatrix};$$

I is the identity matrix; and, $\lambda$ is an optional scalar "whitening" parameter that can be used to stabilize the matrix inversion, if that is needed.

The values of the coefficients so calculated are seismic attributes that are then displayed as an aid to the explorationist. For example, a seismic section or volume might be composed entirely of calculated A values from equation (3), one A value being calculated at each time level of every gather. Since A is usually regarded as being representative of the zero offset reflectivity, a section or volume of these coefficients yields a spatial display that at least theoretically approximates the image that would have been obtained if a zero-offset survey had been conducted. Similarly, a section that consists of the quantity "B" at every time point, is a so-called "gradient stack," which can be very useful in emphasizing portions of the section, wherein AVO effects may be found. Additionally, many mathematical combinations (e.g., sums, differences, ratios, products, etc.) of the calculated coefficients have may also be displayed.

Another useful quantity that is frequently calculated in connection with regression-based AVO attributes is the degree to which the data are adequately "fit" by the selected equation at each time point. The statistical Coefficient of Determination, "r" or "$r^2$" as that quantity is known to those skilled in the art, is one conventional measure of the "goodness of fit" of the model by the data. A large value of $r^2$ (i.e., a value near 1.0) indicates that the data are well fit at that time level by the selected equation. However, a value of $r^2$ near zero signifies that the seismic amplitudes analyzed at that particular time are not well fit by the selected model and, hence, are possibly contaminated by various coherent noise sources, such as multiples, head waves, converted waves, or processing artifacts, or by various incoherent (random) noise sources, such as wind or cultural sources in land recordings.

Additionally, it is well known that evaluation of the previous expression using the estimated parameter values yields a best-fit prediction of the reflectivity for that trace and time. That is, if A', B', and C' are coefficient values obtained by minimization of the equation (5), then the value $$X'[n,m]=A'+B' \sin^2(\phi_{m,n})+C' \sin^2(\phi_{m,n}) \tan^2(\phi_{m,n})$$

provides a "best" estimate of the reflectivity on the single trace "m" at time "n" according to this model. This process is called "expansion" of the polynomial, per Wright, in U.S. Letters Patent 4,677,597, "Method For Enhancing Common Depth Point Seismic Data", the disclosure of which is incorporated herein by reference.

Finally, those skilled in the art will recognize that the integer variable M introduced previously must be at least as large as the number of unknown parameters in the fitted equation, or else a conventional solution cannot be obtained (i.e., the resulting system of equations will be under determined). So, in theory this requires that M be at least equal to three where a three parameter equation is fit to the data, and at least as large as two when an equation like equation (3) is utilized. In practice, however, the instant inventors have found that much better results are obtained if at M is at least as large as twenty, i.e., twenty samples (traces) are utilized in the fitting process.

AVO-Based Pre-stack Reflection Attenuation

Figure 6A:
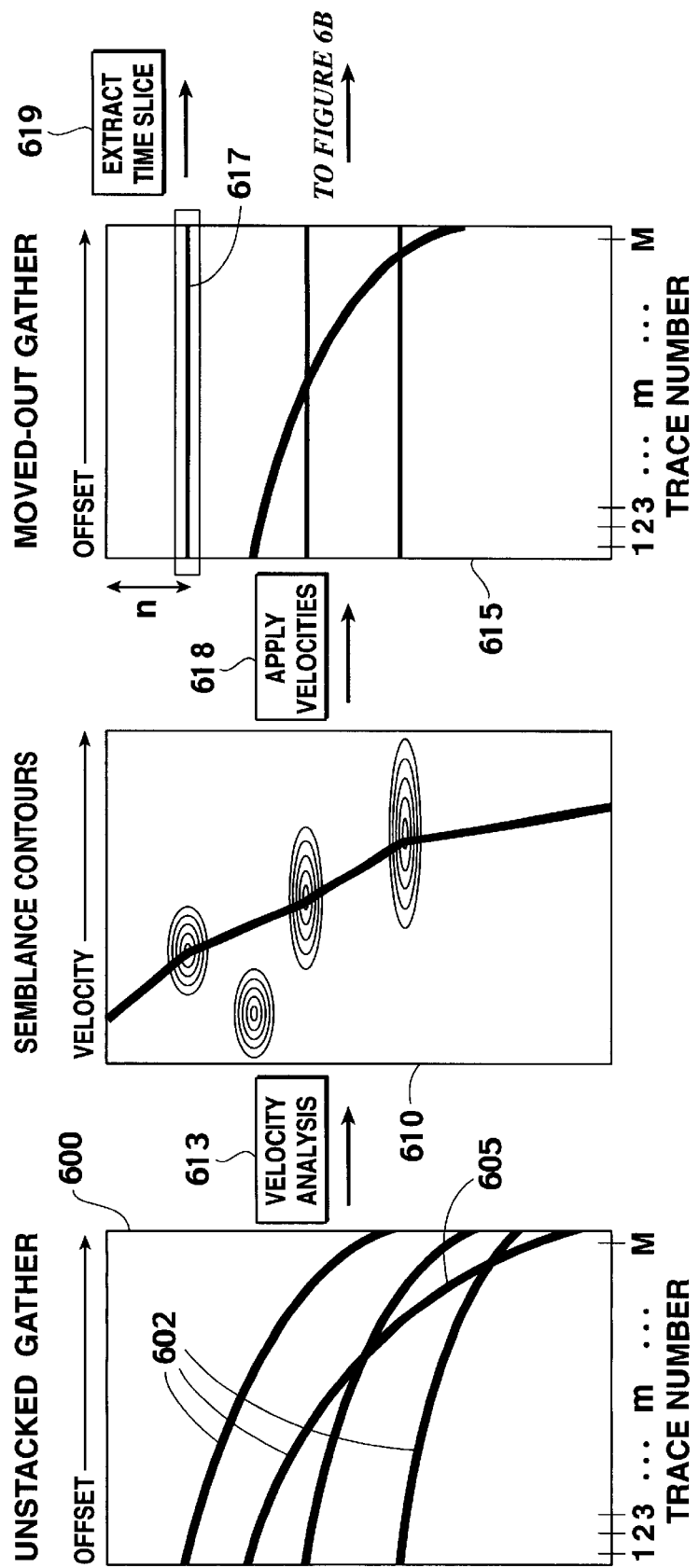
FIG. 6 contains a series of graphic panels that illustrate how the instant method may be used to attenuate certain kinds of seismic reflections.
Figure 6B:
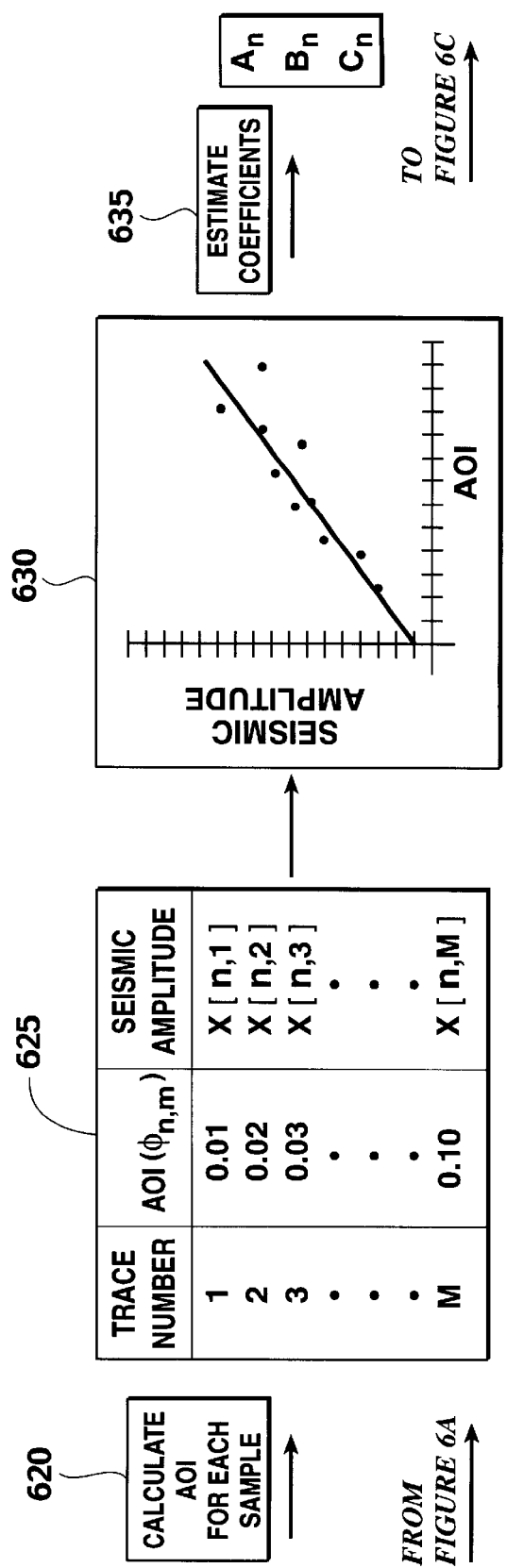
Figure 6C:
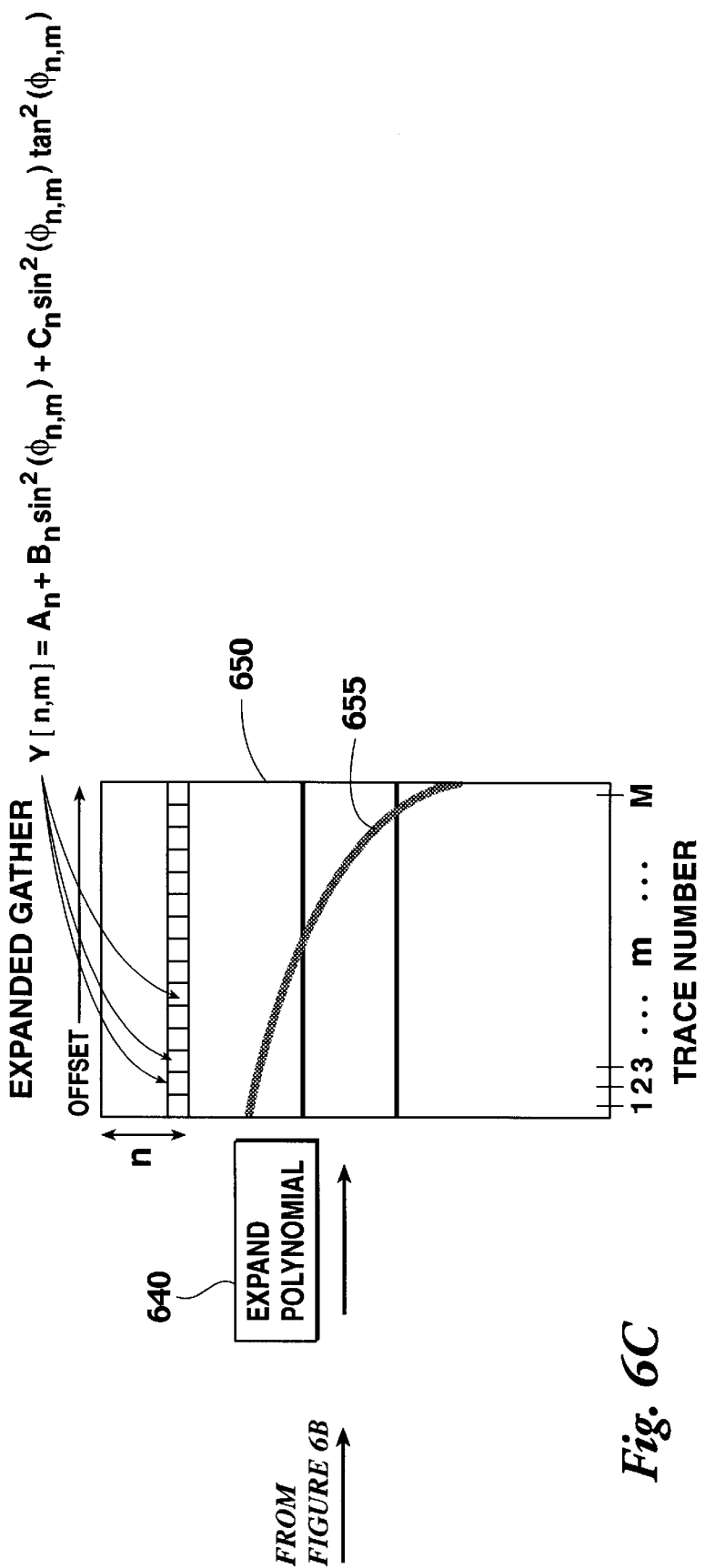

Turning now to a first aspect of the instant invention, there is provided a method of pre-stack attenuation of reflection events containing residual moveout through the use of a polynomial expansion of AVO regression-type attributes. FIGS. 6A, 6B, and 6C illustrate the general steps of the instant method.

As a preferred first step, the reflectors 602 in a seismic gather 600 are flattened in a manner well known to those skilled in the art (FIG. 6A). This would preferably be done by way of a semblance-type velocity analysis 610 and NMO steps 618 discussed previously, although manual or automatic picking and flatting of prominent reflectors would also be acceptable. In either case, the goal is to acquire a seismic gather 615 in which the P reflectors have been at least approximately flattened in time—a gather that has been corrected for travel time between shot and receiver. The NMO process (at least theoretically) places reflected seismic energy from a given reflector at the same two-way travel time on every trace, no matter what the offset of the trace from shot. Finally, although the instant method preferably operates on flattened gathers, those skilled in the art will recognize that physical flatting of the traces in the gather is not an absolute requirement. However, the implementation of the instant method is much simpler if the gathers have been pre-flattened. So, in the text that follows "flattening" will be used to describe traces in a gather that have actually been flattened as well as those traces for which a collection of same travel-time samples can be extracted.

Given a flattened gather 615, as a next step AVO-type regression coefficients are computed, preferably at each time interval in the trace, although the precise time-range over which the AVO attributes is calculated is immaterial to the instant invention. In practice, the explorationist might specify a zone of interest that was bounded by a starting and ending sample number or time.

In that case, the program that implements the instant invention might only calculate the selected AVO coefficients over that restricted time interval, rather than throughout the entire trace.

In the preferred embodiment the coefficients of equation (1) are estimated for each time slice according to the matrix expression (5). As part of that process, a first time slice at the nth sample number is extracted 619 from the flattened gather 615. Then, for each of the extracted samples, an angle of incidence (i.e., "AOI") is preferably calculated. This might be done many different ways, but a preferred method is by ray tracing through a structural model of the subsurface of the earth. As is well known to those skilled in the art, the subsurface model need not be particularly accurate and might contain, by way of example, velocities from a conventional stacking velocity analysis. Methods for creating subsurface models such as would be appropriate for use with the instant embodiment are well known to those skilled in the art. Alternatively, and as was discussed previously, rather than calculating an angle-of-incidence, a formulation which does not require computation of the AOI but instead uses a related measure—such as the use of trace offset in equation (4) supra—might be used. Those skilled in the art realize that many other variations and arrangements are also possible.

Given the AOI values for each sample 625 a curve is next fit 630 through the (AOI, amplitude) pairs to yield estimates of the AVO attributes A, B, and C. Although the plot 630 suggests that there is a linear relationship between AOI and amplitude, in reality the function that best fits these data points will be typically be more complicated and may require the solution of a non-linear system of equations. In the preferred embodiment, though, the functional form introduced in equation (1) will be solved, thereby producing estimates of the parameters A, B, and C at this time level.

Note that the form of the equation solved in the previous step is not a critical part of the instant invention. That is, other functional forms (such as, for example, those presented in equations (2) through (4)) could be used instead without substantial modification of the previous steps. The main requirement is that a function characterized by constant coefficients be fit to the amplitude data from at least one time level, thereby producing estimates of those constant coefficients for use as AVO parameters as detailed below.

Next, the estimated coefficients are used to "expand the polynomial" 640, thereby effectively replacing each original seismic sample in the gather with a mathematically predicted value, the prediction coming from the fitted equation. Note that, in the preferred embodiment, as many predicted traces will be produced as there were traces in the original gather (i.e., M in the present example). Alternatively, rather than actually replacing each seismic value with a predicted value, a new array Y[i,m], i=1, N, m=1, M, might be used instead to store the estimated values. Either approach to creating the expanded gather 650 would be suitable for use with the instant invention.

The previous steps would typically be repeated for many time-slices, perhaps for every time slice in the gather. The seismic values that result from the expansion step are now suitable for further seismic processing as individual seismic traces or as a gather and might be, for example, migrated and/or then stacked. In more particular, the traces in this gather should exhibit attenuation of undesired reflections with respect to the primary or other desired P-wave reflections. The reason for this is as follows. Since the typical AVO model is designed to accommodate P-data only, the curve fit will tend to accurately model the actual data only when the reflection is a P-wave. In the event that the reflection is, for example, a C-wave or multiple, the equation will not fit the observed amplitudes very well and the reconstructed (expanded) data will not resemble the original amplitudes to any great extent.

On the other hand, when the modeled reflector is a P event, the curve fit will generally be much better, so that the expanded fit will accurately the model the data present at that time: in effect, the original seismic values will be reproduced. Thus, this expansion provides a method of pre-stack attenuation of non-P-wave reflectors. This effect is generally illustrated in FIG. 6. Low velocity event 605 is seen cutting across P-reflections 602. This low velocity event might be a multiple, a converted wave, etc. After the application of moveout 618, estimation of the coefficients 635, and expansion of the polynomial 640, attenuation of the low velocity event 655 should be observed.

It should be noted that even though the phrase "expand the polynomial" suggests that a polynomial has been fit to the data, in actuality that might not have been done. The exact functional form fit to the gather might be a true polynomial (e.g., equation (4)) or some other function. Most generally, the instant method fits a function characterized by constant coefficients to amplitudes extracted from a seismic trace and the offsets corresponding to those amplitudes. That is, the observed seismic reflectivity is fit as a function, F, of offset and two or more unknown coefficients Reflectivity=F(offset, $A_1, A_2, \ldots$ )

to produce as many estimates of the coefficients. So, the phrase "expansion of the polynomial" will be used herein in the sense of including using the estimated coefficient values, along with some measure of the angle of incidence (or offset from the shot), in a particular functional form to obtain an estimate of a seismic value for a particular offset and time.

Finally, note that within the instant disclosure, the phrase "polynomial expansion" takes a different meaning from the meaning of same term as it used in Wright, 1987, cited previously. In the instant embodiment, polynomial expansion refers to the replacement of every sample in each trace in a gather with new sample values calculated by back-substitution of the estimated coefficients into the criterion function. In brief, Wright contemplates using an entire gather to produce a single trace as output: a kind of data reduction similar to a stack. Here, however, in the instant embodiment the instant inventors teach using the traces in a gather to produce two or more new traces and, preferably, as many new traces as there were original/input traces.

Identification of AVO Events

Figure 3:
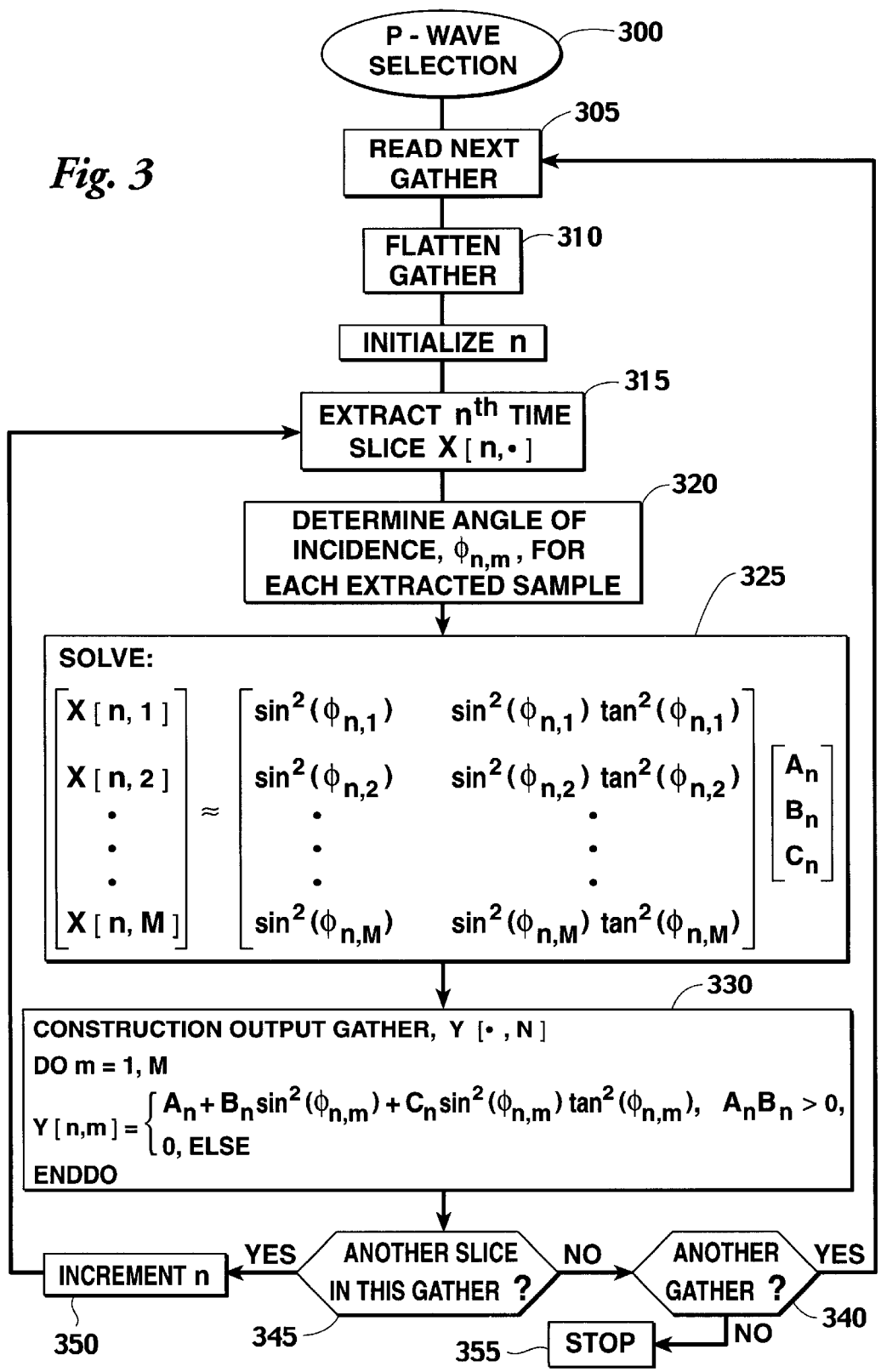
FIG. 3 is a flowchart that illustrates the principal steps in a preferred embodiment of the instant invention.

According to a second aspect of the instant invention, there is provided a method of selection and extraction from an unstacked gather seismic information of potential significance to the exploration for oil and gas. As is generally illustrated in FIG. 3, as a first step a gather is extracted 305 from the seismic survey. The gather might be obtained from a 2-D or 3-D survey. Next, the gather is flattened (step 310), preferably by application of the NMO correction using stacking velocities. The calculation of the AVO coefficients then proceeds (much as has been described previously) by identifying same-time samples (step 315); determining of the angle of incidence for each sample so identified (step 320); and solving the selected AVO modeling equation for its characterizing constants (step 325). In FIG. 3, the solution is expressed as the solution of a linear matrix equation. However, in some cases it might be necessary to solve a nonlinear system of equations, depending on the exact functional form of the modeling equation. In either case, the goal is to obtain estimates of the coefficients for this particular time level.

However, rather than unconditionally expanding the polynomial as was described previously, in the instant embodiment the polynomial is expanded only if its coefficients meet some predetermined criterion. Thus, the resulting gather will consist of reconstructed data values at some time levels, and some alternative "null" values (usually "zero") at other time levels.

As is illustrated in FIG. 3, an output array Y[n,m] is preferably made available for storing the expanded values, the dimensions of Y[n,m] being at least as large as those of the original gather X[n,m]. In the preferred embodiment, the expanded values are then determined according to the following equation (step 330):

$$Y[n, m] = \begin{cases} A_n + B_n \sin^2(\phi_{n,m}) + C_n \sin^2(\phi_{n,m})\tan^2(\phi_{n,m}), & A_n B_n > 0, \\ 0, & \text{else} \end{cases}$$

That is, unless the coefficients $A_n$ and $B_n$, satisfy the indicated inequality, a value of zero is stored in that output location. Note that this will result in all of the samples in a given time slice being replaced either by expanded values or the value zero.

The previous inequality is based on the observation that when the coefficients A and B have the same arithmetic sign, that condition is often associated with gas—or some other "unusual" lithologic condition—in the subsurface. Thus, when the product AB is greater than zero, that fact is signaled to the explorationist by expanding the polynomial for that time slice. If the data are subsequently stacked and displayed, the non-zero portions of the stacked section can be rapidly located within a large seismic volume and, if they merit it, subjected to further study aimed at verifying the cause of the anomaly.

Other variations of the rule described above are certainly possible and have been specifically contemplated by the instant inventors. For example, rather than comparing the product of the two coefficients with zero, it might prove more fruitful in some cases to use a rule along the following lines:

$$Y[n,m] = \begin{cases} A_n + B_n \sin^2(\phi_{n,m}) + C_n \sin^2(\phi_{n,m})\tan^2(\phi_{n,m}), & A_n B_n > \varepsilon, \\ 0, & \text{else} \end{cases}$$

where $\varepsilon$ is some small positive quantity. This would tend to filter out some "noisy" cases where A and B happen to have the same sign, but are both so small as to be essentially equal to zero. Clearly, the value of $\varepsilon$ can be varied to suit the circumstances and many other arrangments are possible.

AVO-Based Converted Wave Identification

According to a third aspect of the instant invention, there is provided a means for identifying C-wave reflections in a seismic gather by fitting an AVO-type polynomial to the seismic data and observing the relative sizes of the coefficients so calculated. Once the C-mode reflectors have been identified, the AVO polynomial can be expanded for those time slices that are not C-mode, thereby attenuating or eliminating C-waves from the section. Alternatively, the AVO polynomial can be expanded only for those time slices that appear to be C-mode, thereby producing a converted-wave-only section. Further, more than one polynomial might be calculated at each time interval and the polynomial that best fits the data in that time interval expanded. In any case, the resulting seismic section or volume can be used by the explorationist to identify and eliminate converted wave reflections from his or her interpretation.

The steps of the instant method are largely the same as those of the previous embodiment, except that the polynomial expansion rule is different. In more particular, the instant inventors have discovered that converted wave reflections, when fit by the AVO function discussed previously, would be expected to have an A coefficient that is near zero. Thus, polynomial expansion by the following rule:

$$Y[n,m] = \begin{cases} A_n + B_n \sin^2(\phi_{n,m}) + C_n \sin^2(\phi_{n,m})\tan^2(\phi_{n,m}), & |A_n| < \varepsilon, \\ 0, & \text{else} \end{cases}$$

where $\varepsilon$ is a small positive value, would be expected to produce a converted wave-only section. On the other hand, expansion according to the following rule $$Y[n,m] = \begin{cases} A_n + B_n \sin^2(\phi_{n,m}) + C_n \sin^2(\phi_{n,m})\tan^2(\phi_{n,m}), & |A_n| > \varepsilon, \\ 0, & \text{else} \end{cases}$$

would tend to produce a section devoid of C-mode reflections. Obviously, the value of epsilon may be varied according to the needs of the interpreter and may need to be determined by trial-and-error for some seismic data sets. After polynomial expansion according to either of the previous rules, the resulting gather is then available for conventional seismic processing and subsequent interpretation.

Of course, there are many ways in which the instant expansion might be modified. For example, in some cases it might prove to be useful to normalize the calculated A value by dividing it by one or more of the other coefficients, e.g., $$\hat{A}_n = \frac{A_n}{|A_n| + |B_n| + |C_n|},$$

where $\hat{A}_n$, rather than A, will now be compared with $\varepsilon$. Further variations along the same lines are certainly possible and have been specifically contemplated by the instant inventors.

Note that in the instant embodiment the C-mode reflections are assumed to have been flattened by the velocity analysis/NMO step. In the first embodiment discussed previously, the reflectors that are attenuated will be those that are not flattened. Here, the goal is the recognition and separation of converted mode reflections that may have been mistaken for pure P-mode reflections, and which have been flattened—either intentionally or accidentally—by the NMO process. This is particularly important in the case of converted waves which, unlike "C-waves", reconvert back to P-waves after a short shear leg. For example, a wave might convert from a P mode to an S mode at the top of a salt body; reflect from the base of the salt as an S wave; and then convert back to P in transmission through the top of the salt. This process might be modeled according to the following expression:

$$R_{psp}(\phi) = T_{ps}(\phi) R_{ss}(\phi) T_{sp}(\phi) = [D\sin(\phi) + E\sin^3(\phi)][H + K\sin^2(\phi)] \\ [F\sin(\phi) + G\sin^3(\phi)] \quad (5)$$

where $R_{psp}(\phi)$ is the reflection/conversion coefficient of a P-S-P event, $R_{ps}(\phi)$ is the reflection coefficient of a P-S event $T_{sp}(\phi)$ is the transmission/conversion coefficient of an S-P event; and, $T_{ps}(\phi)$ is the transmission/conversion coefficient of a P-S event. Examination of this relation shows that for small values of $\phi$, $R_{psp}(\phi)$ will be small, but for large values of $\phi$, $R_{psp}(\phi)$ will be large. Comparing the previous equation with equation (1), it should be clear that for reflected energy having amplitudes exactly governed by this relationship, the A coefficient will be equal to zero. Hence, the source of the instant rule.

It should also be noted that, for P-reflections, A and B should be approximately the same size. More precisely, under fairly robust assumptions:

$$A = B \int_{\phi_1}^{\phi_2} \sin^2(\phi) d\phi,$$

where $\phi_1$ is the smallest AOI in the gather (usually about 0°) and $\phi_2$ is the largest AOI in the gather (typically around 45°). This suggests the following rule for polynomial expansion if the goal is to produce a P-mode section:

$$Y[n,m] = \begin{cases} A_n + B_n \sin^2(\phi_{n,m}) + C_n \sin^2(\phi_{n,m})\tan^2(\phi_{n,m}), & |A_n| - |B_n| < \varepsilon, \\ 0, & \text{else} \end{cases}$$

where the value of $\varepsilon$ may need to be determined on a case-by-case basis.

Goodness of Fit AVO Display

According still another aspect of the instant invention, there is provided a method of polynomial expansion of AVO equations, wherein the rule for polynomial expansion is dependent on the degree to which the unstacked seismic data fits the calculated AVO polynomial at each time slice. The instant method is substantially similar to the previous method, except that the rule for expanding the polynomial differs.

In the preferred embodiment, the seismic data will be pre-processed, sorted into gathers, and flattened as described previously. Also as before, a zone of interest will be selected by the seismic processor. Then each gather is selected and processed one slice at a time to estimate the unknown coefficients of the AVO modeling equation. Then, the polynomial is expanded as before, but a different rule is used to determine whether or not to display the expanded results.

That is, $$Y[n,m] = \begin{cases} A_n + B_n \sin^2(\phi_{n,m}) + C_n \sin^2(\phi_{m,n})\tan^2(\phi_{m,n}), & r_n^2 > d \\ 0, & \text{else} \end{cases},$$

where $r_n^2$ is the statistical Coefficient of Determination for the previous fit for the nth time slice and d is an arbitrary positive value selected in accordance with the discussion that follows.

Those skilled in the art know that in regression analysis, the Coefficient of Determination is a statistical measure of causal association between two variables, where the higher the numerical value (on a scale of 0.0 to +1.0) the greater the degree of association. More formally, this statistic is a measure of the proportion of the total variation in the predicted variable that is associated with variations in the predictors in the regression equation. Thus, a Coefficient of Determination of, say, 0.85 means that 85% of the variance in the predicted variable is attributable to the regression model, whereas 15% is unexplained. In brief, values of the Coefficient of Determination near 1.0 indicate that the data are well fit by the regression model, whereas values near zero indicate that a poor fit with the model. Although there are many ways to express the computational formula for the Coefficient of Determination, a preferred way to do so is as follows:

$$r_n^2 = \frac{\sum_{m=1}^{M}[X[n,m]-\overline{X}[n,\bullet]]^2 - \sum_{m=1}^{M}[X[n,m]-A_n-B_n\sin^2(\phi_{n,m})-C_n\sin^2(\phi_{n,m})\tan^2(\phi_{n,m})]^2}{\sum_{m=1}^{M}[X[n,m]-\overline{X}[n,\bullet]]^2}$$

$$= \frac{\text{Mean } SS - SSE}{\text{Total } SS}$$

where $\overline{X}[n,\bullet]$ is the arthmetic average over m of the $X[n,m]$; where Mean SS is the sum of squares about the mean (the first term in the numerator) and SSE is the sum of squares due to lack of fit by the regression (the second term in the numerator). Those skilled in the art will recognize that there are many other ways to formulate the Coefficient of Determination. However, the essential feature of this statistical measure is that it returns some indication of the goodness of fit of the AVO model to the data at that time slice.

In terms of the instant embodiment, relatively larges values of the Coefficient of Determination indicate that the seismic data at those time levels are well modeled by the AVO equation and, thus, correspond at least approximately to expected P-mode AVO effects. Thus, in this instant embodiment, the AVO polynomials are expanded only for those time levels that have an associated $r^2$ that is high, i.e., "near" 1.0. The inventors have found that a value of d near 0.50 is a good choice in many situations. In the alternative, of course, the polynomial might be expanded only for those time slices with values or $r_n^2$ near zero, however the interpretation of the resulting display would then be different.

For those polynomials not expanded, a constant substitute value is chosen as a replacement seismic value for each trace at that time level. In the preferred embodiment, and as is illustrated in the previous equation, the value zero has been chosen as the substitute value. However, that value was selected for purposes of convenience only and many other choices might be used instead. A main purpose of replacing the non-expanded time levels with a constant value is to make those time levels readily recognizable by the explorationist who will be viewing and analyzing the output from this method. In the text that follows, the substitute value will be typically be taken to be equal to zero, but it should be remembered that this was done for purposes of specificity only.

A display formed in this manner provides a means for the explorationist to rapidly identify within a section or volume those locations in time and space where the data are accurately fit by the particular AVO model used. Using this display, in conjunction with some of the other displays discussed previously, would allow the explorationist to not only identify AVO anomalies, but also to judge whether or not the AVO affect occurred by chance or in concert with the selected AVO model.

The preceding discussion suggests still another way to recognize converted mode reflections in an unstacked gather. Note that equation (5) is exact for converted-mode reflections, whereas equations (1) to (4) are applicable only to P reflections. Thus, if both equations are applied to the same time-slice of seismic data values, the AVO equation that is most appropriate should "fit" the data better. This suggests the following rule for recognizing and displaying C-mode reflections:

$$Y[n,m] = \begin{cases} [D_n\sin(\phi_{m,n}) + E_n\sin^3(\phi_{m,n})][F_n\sin(\phi_{m,n}) + G_n\sin^3(\phi_{m,n})], & r_n^2 > c \\ 0, & \text{else} \end{cases}$$

where $r^2$ now is calculated with respect to the fit function of equation (5). Another variant of the instant idea could be used to construct a section or volume that maps the location of P and C-mode reflectors at all times. Let $r^2(1)$ be the Coefficient of Determiination calculated for a fit of equation (1) and $r^2(5)$ be the same quantity calculated for equation (5). That is, at each time slice both equation (1) and equation (5) will be fit to the same seismic values. A corresponding Coefficient of Determination will also be calculated for each. Then, the following display rule could be used to create indicator variables that would point to those portions of the seismic section that tend to appear more like P or C-modes:

$$Y[m,n] = \begin{cases} 1, & r_n^2(1) > c \\ -1, & r_n^2(5) > c \\ 0, & \text{else} \end{cases}$$

The parameter c, as it was described previously, is preferably chosen to be relatively near to unity. The resulting display will have positive values where there is an indication that the reflection event is a P-wave, and negative values where there is some confidence the event is a C-wave, and a value of zero where there is no strong indication either way. More generally, any number of functions could be fit to the data, each having with a different indicator value assigned to each. Then, the indicator value corresponding to the best fit would be stored in a single output trace for subsequent display and analysis. Clearly, many other variations of this scheme are possible.

Conclusions

Although the invention disclosed herein was discussed almost exclusively in terms of seismic traces organized into "CMP" gathers, that was done for purposes of specificity only and not out of any intent to limit the instant invention to operation on only that sort of gather. So, within the text of this disclosure, the term CMP gather is used in the broadest possible sense of that term, and is meant to apply to conventional 2D and 3D CMP gathers, as well as to other sorts of gathers which might include, without limitation, CRP gathers, CCP gathers (i.e., "common conversion point" gathers), CACP ("common asymptotic conversion point") gathers, etc, the most important aspect of a "gather" being that it represents an organized collection of unstacked seismic traces from either a 2D or 3D survey all of which have at least one subsurface image point in common.

Additionally, the term "angle of incidence" or AOI should be interpreted herein in the broadest possible sense of that term. The preferred meaning of AOI is the one that is conventional in AVO analysis: angle of incidence at a particular time level. However, in the broader sense, it should be taken to include any offset-dependent quantity, whether or not dependent on time.

Further, although it is anticipated that, generally speaking, when polynomial expansion is applied to the unstacked gathers, as many predicted traces will be produced as there were input traces in the gather, many other arrangements and variations are certainly possible. For example, where traces are missing from a gather, the instant method provides a way of reconstructing them by using the offset/angle of incidence information from neighboring traces. So, in that case, more traces might be reconstructed than were present in the original gather. On the other hand, in other cases it might be necessary to reduce the fold of a gather (e.g., to reduce storage requirements or to match the offsets of another survey or model study). In that case, fewer traces could be produced for output than there were available as input. Additionally, the output traces need not be positioned at the same surface locations as the input traces: by interpolating or extrapolating AOI or offset information, traces can be created where none existed previously.

Finally, in the previous discussion, the language has been expressed in terms of operations performed on conventional seismic data. But, it is understood by those skilled in the art that the invention herein described could be applied advantageously in other subject matter areas, and used to locate other subsurface minerals besides hydrocarbons, e.g., coal. By way of additional examples, the same approach described herein could be used to process and/or analyze multi-component seismic data, shear wave data, magnetotelluric data, cross well survey data, full waveform sonic logs, or model-based digital simulations of any of the foregoing. Additionally, the methods claimed herein after can be applied to transformed versions of these same data traces including, for example: frequency domain Fourier transformed data; transformations by discrete orthonormal transforms; instantaneous phase, instantaneous frequency, analytic traces, and quadrature traces; etc. In short, the process disclosed herein can potentially be applied to any collection of geophysical time series, and mathematical transformations of same, but it is preferably applied to a collection of spatially related time series containing structural and stratigraphic features. Thus, in the text that follows those skilled in the art will understand that "seismic trace" is used herein in a generic sense to apply to geophysical time series in general.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

REFERENCES

The documents and texts that are listed below are specifically incorporated by reference into this patent application.

Aki, K. and P. Richards, 1980, *Quantitative Seismology*, Freeman Press, N.Y.

Castagna, J., and Backus, M., editors, 1993, *Offset-Dependent Reflectivity—Theory and Practice of AVO Analysis*, SEG Press.

Yilmaz, Ozdogan, 1987. *Seismic Data Processing*, Society of Exploration Geophysicists.

What is claimed is:

1. A method of processing seismic data for use in geophysical exploration within a predetermined volume of the earth containing structural and stratigraphic features conducive to the generation, migration, accumulation, or presence of hydrocarbons, comprising the steps of:

(a) accessing at least a portion of a seismic survey that images at least a portion of said predetermined volume of the earth,
       said seismic survey being comprised of a plurality of unstacked seismic traces, and,
       each of said unstacked seismic traces consisting of digital samples, (b) selecting at least two of said unstacked seismic traces;

(c) selecting at least one digital sample from each selected unstacked seismic trace;

(d) determining an angle of incidence for each digital sample so selected;

(e) fitting a function characterized by at least one constant coefficient to said selected digital samples and said determined angles of incidence, thereby producing coefficient estimates for each of said at least one constant coefficients;

(f) expanding said function characterized by at least one constant coefficient using said at least one coefficient estimates, thereby producing at least two predicted samples;

(g) performing steps (c) through (f) a predetermined number of times, thereby producing a plurality of predicted samples; and, (h) organizing said plurality of predicted samples into at least two predicted seismic traces, said predicted seismic traces for use in identifying said structural and stratigraphic features within at least a portion of said predetermined volume of the earth.

2. A method according to claim 1, further comprising the step of:

(i) stacking said predicted seismic traces, thereby producing a stacked seismic attribute trace, said stacked seismic attribute trace providing an image representative of at least some of said structural and stratigraphic features within said at least a portion of said predetermined volume of the earth.

3. A method according to claim 2, further comprising the steps of:

(j) performing steps (b) to (i) a predetermined number of times, thereby producing a predetermined number of stacked seismic attribute traces.

4. A method according to claim 3, further comprising the step of:

(k) displaying at least a portion of any stacked seismic attribute traces so produced.

5. A method according to claim 1, wherein each of said unstacked seismic traces is associated with a CMP gather, and wherein said at least two selected unstacked seismic traces are associated with a same CMP gather.

6. A method according to claim 5, wherein said same CMP gather is a flattened CMP gather.

7. A method according to claim 1, wherein step (e) includes the steps of:
(e1) choosing a function characterized by at least one constant coefficient,
(e2) fitting said selected digital samples and said determined angles of incidence using said chosen function, thereby producing coefficient estimates for each of said at least one constant coefficients,
(e3) calculating a goodness of fit value using said chosen function, said coefficient estimates, and said selected digital samples,
(e4) performing steps (e1) to (e3) a predetermined number of times, thereby producing a predetermined number of chosen functions and a predetermined number of goodness of fit values associated therewith,
(e5) selecting, using said goodness of fit values, a representative function from among said predetermined number of chosen functions, and,
(e6) choosing said coefficient estimates associated with said representative function, and step (f) includes the step of:
(f1) expanding said selected function using said chosen coefficient estimates.

8. A method according to claim 7, wherein step (e5) includes the step of
(i) selecting a particular goodness of fit value from among said predetermined number of goodness of fit values, wherein said particular goodness of fit value corresponds to a best fit of said selected digital samples and said determined angles of incidence among said predetermined number of chosen functions, and,
(ii) selecting a function associated with said particular goodness of fit value as a representative function.

9. A method according to claim 8, wherein said particular goodness of fit value is a numerically largest of said predetermined number of goodness of fit values.

10. A method according to claim 7, wherein said goodness of fit value is a Coefficient of Determination.

11. A method according to claim 1, wherein step (e) includes the steps of:
(e1) selecting a function characterized by at least one constant coefficient,
(e2) fitting said selected function to said selected digital samples and said determined angles of incidence, thereby producing coefficient estimates for each of said at least one constants, and,
(e3) calculating a Coefficient of Determination associated with said selected function and said coefficient estimates.

12. A method according to claim 11, wherein step (f) includes the steps of:
(f1) comparing said Coefficient of Determination with a predetermined value, and
(f2) if said Coefficient of Determination is greater than said predetermined value, expanding said selected function using said coefficient estimates, thereby producing at least two predicted samples, and if said Coefficient of Determination is not greater than said predetermined value, selecting at least two predetermined substitute values, thereby producing at least two predicted samples.

13. A method according to claim 1, wherein step (f) includes the steps of:
(f1) examining said at least one coefficient estimates to determine whether said coefficient estimates are indicative of an AVO effect, and,
(f2) if said AVO effect is indicated,
expanding said function using said coefficient estimates, thereby producing at least two predicted samples, and if said AVO effect is not indicated,
producing at least two predicted samples by choosing a same predetermined substitute value.

14. A method according to claim 1, wherein step (f) includes the steps of:
(f1) examining said at least one coefficient estimates to determine whether said coefficient estimates are indicative of a P-wave reflection, and,
(f2) if said P-wave reflection is indicated,
expanding said function using said coefficient estimates, thereby producing at least two predicted samples, and
if said P-wave reflection is not indicated,
selecting at least two predetermined substitute values, thereby producing at least two predicted samples.

15. A method according to claim 1, wherein said function characterized by at least one constant of step (e) is selected from a group consisting of:

$$R_p(\phi)=A+B\sin^2(\phi)+C\sin^2(\phi)\tan^2(\phi),$$

$$R_p(\phi)=A+B\sin^2(\phi)+C\sin^4(\phi),$$

$$R_p(\phi)=A\cos^2(\phi)+B\sin^2(\phi),$$

$$R_p(\phi)=[D\sin(\phi)+E\sin^3(\phi)][H+K\sin^2(\phi)][F\sin(\phi)+G\sin^3(\phi)]$$

and, $$R_p(\phi)=[D\sin(\phi)+E\sin^3(\phi)][F\sin(\phi)+G\sin^3(\phi)]$$

where $R_p(\phi)$ represents said selected digital samples, where $\phi$ represents said determined angles of incidence, and, where A, B, and C, D, E, F, G, H, and K are said at least one constant coefficients.

16. A method according to claim 1,
wherein each of said selected unstacked seismic traces has an offset associated therewith, wherein there is a maximum offset associated with said selected unstacked seismic trace offsets, and,
wherein said function characterized by at least one constant is defined as follows:

$$R_p(x)=A+B(x/x_m)+C(x/x_m)^4$$

where $R_p(x)$ represents said selected digital samples, where x represents said offset associated with each of said selected unstacked seismic traces, where $x_m$ is said maximum offset, and, where A, B, and C, are said at least one constant coefficients.

17. A method of reflector attenuation for use in seismic exploration, wherein is provided a seismic survey collected over a predetermined volume of the earth containing structural and stratigraphic features conducive to the generation, migration, accumulation, or presence of hydrocarbons, said seismic survey comprising the steps of:

(a) accessing at least a portion of a seismic survey collected over said predetermined volume of the earth, said seismic survey being comprised of unstacked seismic traces, and, each of said unstacked seismic traces being associated with a gather and consisting of digital samples, each of said digital samples being associated with a time level;

(b) selecting at least two seismic traces associated with a same gather, said selected seismic traces having at least one seismic reflector common thereto;

(c) at least approximately flattening said selected seismic traces with respect to at least one of said common seismic reflectors, thereby producing at least one flattened common seismic reflector and at least two flattened seismic traces;

(d) selecting at least one digital sample from each flattened seismic trace, each of said at least one digital samples being associated with a same time level;

(e) determining an angle of incidence for each digital sample so selected;

(f) fitting a function characterized by at least one constant coefficient to said selected digital samples and said determined angles of incidence, thereby producing coefficient estimates for each of said at least one constant coefficients;

(g) expanding said function using said at least one coefficient estimates, thereby producing at least two predicted samples;

(h) performing steps (d) through (g) a predetermined number of times, thereby producing a plurality of predicted samples; and, (i) organizing said plurality of predicted samples into at least two predicted seismic traces, thereby producing a seismic attribute gather for use in identifying said structural and stratigraphic features within said predetermined volume of the earth, wherein said flattened common seismic reflectors are enhanced with respect to any reflectors not so flattened.

18. A method according to claim 17, further comprising the step of:

(j) stacking said seismic attribute gather, thereby producing an image representative of at least some part of said structural and stratigraphic features within said predetermined volume of the earth.

19. A method of creating a seismic attribute display for use in geophysical exploration within a predetermined volume of the earth containing structural and stratigraphic features conducive to the generation, migration, accumulation, or presence of hydrocarbons, comprising the steps of:

(a) accessing at least a portion of a seismic survey that images at least a portion of said predetermined volume of the earth,
   said seismic survey being comprised of a plurality of unstacked seismic traces,
each of said unstacked seismic traces consisting of digital samples;

(b) selecting at least two of said unstacked seismic traces;

(c) selecting at least one digital sample from each selected unstacked seismic trace;

(d) determining an angle of incidence for each digital sample so selected;

(e) choosing a function characterized by at least one constant coefficient;

(f) associating an indicator value with said chosen function;

(g) fitting said chosen function to said selected digital samples and said determined angles of incidence, thereby producing coefficient estimates for each of said at least one constant coefficients;

(h) performing steps (e) through (g) a plurality of times, thereby producing a plurality of chosen functions, a plurality of associated indicator values, and a predetermined number of associated coefficient estimates;

(i) choosing a particular function from among said plurality of functions;

(j) choosing an indicator value associated with said chosen particular function;

(k) performing steps (c) through (j) a predetermined number of times, thereby producing a predetermined number of chosen indicator values; and, (l) organizing said predetermined number of chosen particular indicator values into at seismic attribute trace for use in identifying said structural and stratigraphic features within said at least a portion of said predetermined volume of the earth.

20. A method according to claim 19, wherein steps (b) through (l) are performed a predetermined number of times, thereby producing a predetermined number of seismic attribute traces.

21. A method according to claim 20, further comprising the step of (m) displaying at least a portion of said predetermined number of seismic attribute traces.

22. A method according to claim 20, wherein the step of choosing a particular function from among said plurality of functions, includes the step of choosing a particular function from among said plurality of functions that best represents said digital samples and angles of incidence.

23. A method according to claim 22, wherein the step of choosing a particular function from among said plurality of functions includes the steps of:

(i1) calculating a Coefficient of Determination for each of said plurality of digital samples and determined angles of incidence, (i2) choosing a particular function from among said plurality of functions using said calculated Coefficients of Determination.

24. A method according to claim 23, wherein step (i2) includes the step of selecting a particular function corresponding to a largest calculated value among said Coefficients of Determination.

* * * * *

UNITED STATES PATENT AND TRADEMARK OFFICE
CERTIFICATE OF CORRECTION

PATENT NO.     : 6,263,284 B1
DATED          : July 17, 2001
INVENTOR(S)    : Richard L. Crider, Leon Thomsen and Gerard Beaudoin It is certified that error appears in the above-identified patent and that said Letters Patent is hereby corrected as shown below:

<u>Column 4,</u>
Lines 54 and 55, "Additionally, since the hydrocarbon" should read -- Additionally, the hydrocarbon --
Line 56, "coefficient, but the signature" should read -- coefficient; the signature --

<u>Column 5,</u>
Line 23, "calculated, $^{2r}$ being one" should read -- calculated, $r^2$ being one --

<u>Column 8,</u>
Line 16, "that other units are certainly" should read -- that other units that are certainly --

<u>Column 9,</u>
Line 58, "used in place of the previous." should read -- used. --

<u>Column 10,</u>
Line 44, "$\Phi^+X$," should read -- $\Phi^TX$, --

<u>Column 11,</u>
Line 8, "coefficients have may also be displayed." should read -- coefficients may also be displayed. --
Lines 47 and 48, "if at M is at least as large" should read -- if M is at least as large --

<u>Column 12,</u>
Line 51, "will be typically be more" should read -- will typically be more --

<u>Column 13,</u>
Line 29, "accurately the model the data" should read -- accurately model the data --

<u>Column 14,</u>
Line 1, "embodiment the instant inventors teach" should read -- embodiment of the instant invention, --
Line 9, "an unstacked gather seismic" should read -- an unstacked gather of seismic --
Lines 17 and 18, "determining of the angle of incidence" should read -- determining the angle of incidence --

UNITED STATES PATENT AND TRADEMARK OFFICE
CERTIFICATE OF CORRECTION

PATENT NO. : 6,263,284 B1
DATED : July 17, 2001
INVENTOR(S) : Richard L. Crider, Leon Thomsen and Gerard Beaudoin It is certified that error appears in the above-identified patent and that said Letters Patent is hereby corrected as shown below:

Column 15,
Line 54, "and subsequent interpretion." should read -- and subsequent interpretation. --

Column 16,
Line 50, "Goodness of Fit AVO Display" should read -- "Goodness of Fit" AVO Display --

Column 17,
Line 24, "indicate that a poor fit with" should read -- indicate a poor fit with --

Column 18,
Line 36, "Coefficient of Determiination" should read -- Coefficient of Determination --
Line 58, "each having with a different indicator" should read -- each having a different indicator --

Column 22,
Line 55, "$A+B(x/x_m)+C(x/x_m)^4$" should read -- $A+B(x/x_m)^2+C(x/x_m)^4$ --
Line 63, "wherein is provided a seismic" should read -- wherein there is provided a seismic --

Signed and Sealed this

Twenty-ninth Day of October, 2002

*Attest:*

JAMES E. ROGAN
*Attesting Officer*     *Director of the United States Patent and Trademark Office*